United States Patent [19]

Meguro et al.

[11] Patent Number: 4,843,510
[45] Date of Patent: Jun. 27, 1989

[54] MAGNETIC TAPE CASSETTE WITH TAPE PROTECTIVE CLOSURE AND LOCK MECHANISM

[75] Inventors: Hiroshi Meguro, Miyagi; Yoshinori Yamamoto, Kanagawa; Masao Ohyama, Tokyo; Kenichi Horikawa, Tokyo; Shigeru Mizusawa, Tokyo; Kenji Kawakami, Kanagawa, all of Japan

[73] Assignee: Sony Corporation, Tokyo, Japan

[21] Appl. No.: 704,943

[22] Filed: Feb. 25, 1985

[30] Foreign Application Priority Data

Mar. 7, 1984 [JP] Japan ................... 59-43574

[51] Int. Cl.⁴ ................... G11B 15/32; G11B 23/04
[52] U.S. Cl. ................... 360/132; 242/198
[58] Field of Search ............ 360/85, 93, 96.1, 132; 242/197-199

[56] References Cited

U.S. PATENT DOCUMENTS

| | | | |
|---|---|---|---|
| 3,900,172 | 8/1975 | Kamaya | 242/198 |
| 4,235,395 | 11/1980 | Wardenaar et al. | 242/199 |
| 4,372,504 | 2/1983 | Shibata et al. | 242/198 |
| 4,541,581 | 9/1985 | Hara | 242/198 |
| 4,572,461 | 2/1986 | Horikawa et al. | 242/198 |
| 4,576,345 | 3/1986 | Koken et al. | 242/198 |
| 4,660,784 | 4/1987 | Sumida et al. | 242/198 |

FOREIGN PATENT DOCUMENTS

| | | | |
|---|---|---|---|
| 0078696 | 5/1983 | European Pat. Off. | |
| 2313007 | 9/1973 | Fed. Rep. of Germany | 360/132 |
| 56-16976 | 2/1981 | Japan | 360/133 |
| 57-147174 | 9/1982 | Japan | 360/132 |
| 58-91564 | 5/1983 | Japan | 360/132 |
| 59-203284 | 11/1984 | Japan | 360/132 |
| 60-57587 | 4/1985 | Japan | 360/132 |
| 2020630 | 11/1979 | United Kingdom | |
| 2152009 | 7/1985 | United Kingdom | |

*Primary Examiner*—John H. Wolff
*Attorney, Agent, or Firm*—Ronald P. Kananen

[57] ABSTRACT

A magnetic tape cassette is provided with a pivotal closure lid pivotably secured to both sides of a casing for movement between a closed position, in which the front opening of the casing, through which a magnetic tape is accessible for loading onto a rotary head, is covered, and an open position wherein the closure lid is pivoted away from said opening to expose the tape while the cassette is in use. The magnetic tape cassette is also provided with a sliding closure member slidably mounted on the bottom of the casing and cooperative with the aforementioned pivotal closure lid. The sliding closure member is in a closed position while the pivotal closure lid is in its closed position, in which it covers a bottom clearance through which a device constituting part of a tape holding system is inserted, and in an open position while the pivotal closure lid is in its open position to allow the aforementioned device of the tape handling system to reach into the casing through the bottom clearance. A locking pin holds the sliding closure in the current one of its two positions. The sliding closure holds the pivotal closed while in its own closed position.

24 Claims, 6 Drawing Sheets

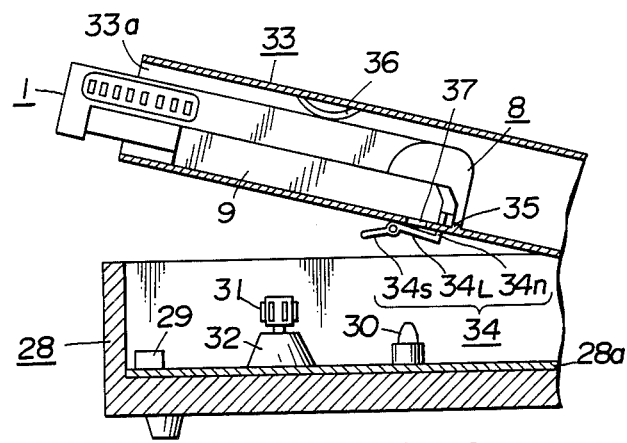
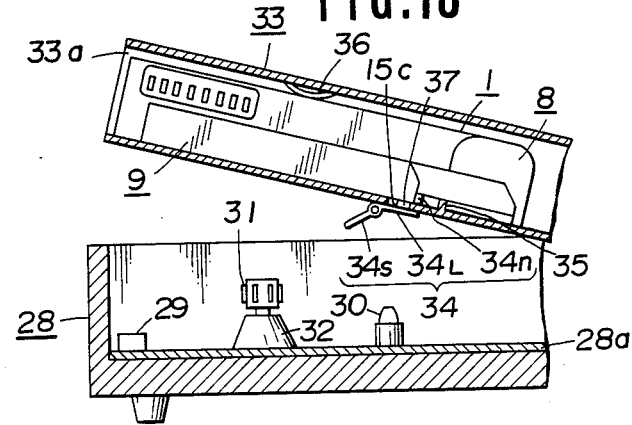
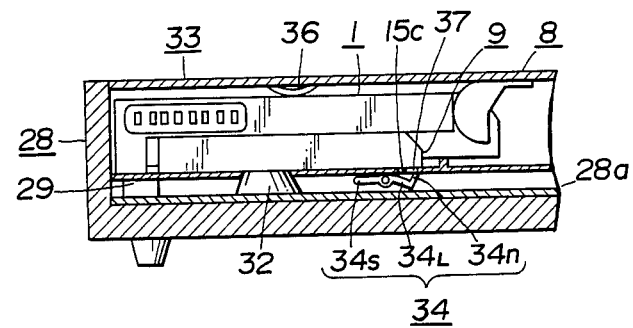

MAGNETIC TAPE CASSETTE WITH TAPE PROTECTIVE CLOSURE AND LOCK MECHANISM

BACKGROUND OF THE INVENTION

The present invention relates generally to a magnetic tape cassette, especially adapted to recording and reproducing pulse code modulated (PCM) signals. More specifically, the invention relates to a magnetic tape cassette provided with a tape protective closure covering a front opening through which a magnetic tape is extracted and accessed, and a locking mechanism for locking the closure open when the cassette is in use and locking it closed when not in use.

Recently, various recording and reproducing apparatus have been developed which convert analog signals, such as audio signals and the like into digital signals, e.g. PCM signals, which are then recorded on and reproduced from magnetic tape serving as a recording medium. Some of these apparatus employ rotary heads so as to achieve a relatively high recording density. Recording and reproducing apparatus specifically designed to record and reproduce PCM signals and employing a rotary head will be referred to as "PCM recorder" throughout the disclosure. A PCM recorder, at first, pulls a loop of a magnetic tape out through a front opening of the cassette and winds the tape around a rotary drum accommodating the rotary head and then the recording and reproducing is performed. In such digital recording and reproducing systems, oily deposits, such as fingerprints or the like, and/or dust adhering to the tape surface may cause dropout of reproduced signals.

Various approaches have been tried to protect the magnetic recording medium. For example, a closure lid may be used to retractably cover the front end opening of the cassette, through which the tape is extracted for access by a rotary head. This closure lid is held closed while the tape is not in use and is moved to an open position when the cassette is inserted into the PCM recorder. In this earlier approach, a drawback may be encountered when the closure lid is unintentionarily or accidentally opened, exposing the tape to oily fingerprints, dust and so forth while it is not in use. A locking mechanism which can conveniently lock the closure lid in its open and closed positions, could resolve this problem.

SUMMARY OF THE INVENTION

Therefore, it is an object of the invention to provide a magnetic tape cassette with a tape protective closure for covering the front opening of the cassette, through which a magnetic tape is extracted for loading onto a rotary head, and a lock mechanism for conveniently and reliably locking the closure in its open position when the cassette is in use and in its closed position when not in use.

Another and more specific object of the invention is to provide a magnetic tape cassette having a locking mechanism which normally locks the closure in its closed position and unlocks the closure when inserted into a corresponding PCM recorder and locks the closure in its open position while the cassette is in use.

In order to accomplish the above-mentioned and other objects, a magnetic tape cassette, according to the invention, is provided with a pivotal closure lid pivotably secured to opposite edges of a casing for movement between an open position, in which the lid exposes the front opening of the casing through which a magnetic tape can be extracted for loading onto a rotary head when the cassette is in use, and a closed position wherein the closure lid covers said opening to prevent access to the tape while the cassette is not in use. The magnetic tape cassette is also provided with a sliding closure member slidably mounted on one face of the casing and cooperative with the aforementioned pivotal closure lid. The sliding closure member is held either in a closed position while the pivotal closure lid is in its closed position to cover a bottom spacing through which a device constituting part of a tape handing mechanism may be inserted, or an open position while the pivotal closure lid is in its open position to allow the aforementioned device of the tape handling mechanism to engage the casing through the bottom spacing so as to load the tape onto the rotary head.

In the preferred structure, the lock mechanism comprises a locking pin vertically reciprocably disposed within the casing. The lower end of the locking pin extends through the bottom of the casing and establishes locking engagement with the sliding closure member in both its closed and open positions.

The locking pin is associated with a resilient spring which normally biases it towards a locking position in which the lower end of the locking pin projects through the bottom of the casing to lock the sliding closure member in either its open position or its closed position, and an unlocking position in which it is retracted into the casing to allow sliding movement of the sliding closure member between its open and closed positions.

According to one aspect of the invention, a magnetic tape cassette comprises a cassette casing having a mouth through which a magnetic tape is accessible, the mouth including a first Opening in a front end face of the casing and a second opening in a lower section of the casing adjacent the front end face, a pivotal lid covering and exposing the first opening of the mouth, a sliding shutter member slidable with respect to the lower section of the cassette casing and adapted to cover and expose the second opening of the mouth, the shutter member being movable between a first position in which it covers the second opening and a second position in which it exposes the second opening, and a spring-biased locking pin disposed within the cassette casing and movable along its longitudinal axis, the locking pin normally holding the shutter member in the first position while the cassette is not in use, and allowing the shutter member to move to the second position when the cassette is inserted into an associated recording and reproducing apparatus.

According to another aspect of the invention, a magnetic tape cassette comprises a cassette casing having a mouth through which a magnetic tape is accessible, the mouth including a first opening in a front end face of the casing and a second opening in a lower section of the casing adjacent the front end face, and a pair of reel shaft apertures through which driving hubs of tape reels are accessible, a pivotal lid for covering and exposing the first opening of the mouth, a sliding shutter member freely slideable in the front-to-rear direction between first and second sliding positions, the reel shaft apertures and the second opening being exposed in the first sliding position and the reef shaft apertures and the second opening being covered by the shutter member in the second sliding position, the sliding shutter member cooperating with the pivotal lid in the second sliding position in such a manner that the shutter member prevents the pivotal lid from exposing the first opening, and a spring-biased locking pin disposed within the cassette casing and movable along its longitudinal axis, the locking pin normally holding the shutter member in the first position while the cassette is not in use, and allowing the shutter member to move to the second position when the cassette is inserted into an associated recording and reproducing apparatus.

According to a further aspect of the invention, a magnetic tape cassette comprises a hollow casing formed with an access opening therein, a tape transport means including a pair of reel hubs rotatably mounted within the casing in a spaced-apart relationship with each other for supporting a magnetic tape wound thereon, the tape transport means defining a tape run including part of the access opening, a brake means mounted within the casing and movable between a braking position in which it prevents the hubs from rotating and a releasing position in which it allows the hubs to rotate, a lid means engageable with the brake means and movable between a closed position in which it covers the opening, thereby partially protecting the tape, and an open position in which it partially uncovers the opening, thereby exposing the tape for cooperation with a recording and reproducing apparatus, the lid means, in moving from the closed position to the open position effecting movement of the brake means from the braking position to the releasing position, and in moving from the open position to the closed position effecting movement of the brake means from the releasing position to the braking position, mounting means mounting the lid means on the casing so as to be mobile between the closed position and the open position, a sliding shutter member slidable with respect to the cassette casing and cooperating with the lid means to fully cover and uncover the access opening, the shutter member being movable between a first position partially covering the access opening and a second position partially uncovering the access opening, and a spring-biased locking pin disposed within the cassette casing and movable along its longitudinal axis, the locking pin normally holding the shutter member in the first position while the cassette is not in use, and allowing the shutter member to move to the second position when the cassette is inserted into an associated recording and reproducing apparatus.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings:

FIGS. 12, 13 and 14 are sections similar to FIG. 10, showing the process of insertion of the preferred embodiment of a magnetic tape cassette into the cassette holder.

DESCRIPTION OF THE PREFERRED EMBODIMENT

Figure 1:
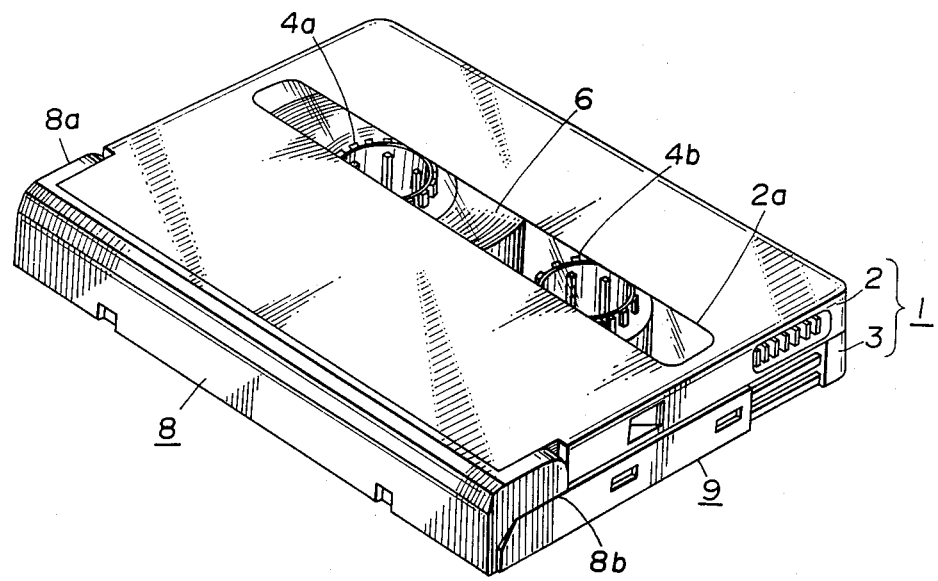
FIG. 1 is a perspective view of the preferred embodiment of a magnetic tape cassette in accordance with the present invention, in which a pivotal closure lid and a sliding closure member are in their respective closed positions.

Referring now to the drawings, particularly to FIGS. 1 to 4, the preferred embodiment of a magnetic tape cassette according to the present invention generally comprises a casing 1 including an upper section 2 and a lower section 3 which are connected by threaded bolts (not shown) in a per se well-known manner, to form a single unit. A transparent window plate 2a is built into the upper surface of the upper section 2. A pair of reel hubs 4a and 4b incorporated into the cassette casing 1 rotatably engage a pair of reel shaft insertion apertures 5a and 5b. The apertures 5a and 5b are formed in the lower section 3 at predetermined positions which establish a suitable spacing betwen the reel hubs 4a and 4b. A magnetic tape 6 is wound around the reel hubs 4a and 4b.

A pivotal closure lid 8 is rotatably or pivotally attached at the right and left side walls of the cassette casing near the front end of the tape cassette. When the pivotal closure lid 8 is pivoted away from the front surface of the tape cassette, the magnetic tape 6 is exposed. An essentially rectangular cut-out 3a is formed in the front end of the lower section 3. When the magnetic tape casssette is inserted into a PCM recorder which will be briefly discussed later, a tape guide system or a device constituting part of a tape retaining mechanism (not shown) which pulls out some of the tape 6 for loading onto a rotary head of the PCM recorder, is inserted into the cut-out portion 3a. A sliding closure member 9 engages the lower section 3 and covers and exposes the cut-out portion 3a as it slides back and forth.

While the tape cassette is not in use, the pivotal closure lid 8 is located opposite a front opening formed in the front surface of the casing 1 to cover the latter. At the same time, the sliding closure is in its forwardly-shifted position in which it covers the cut-out portion 3a of the lower section 3 and thus prevents the tape guide system from reaching into the tape cassette for the tape. The pivotal closure lid can pivot away from the front surface of the cassette to expose the magnetic tape 6, and the sliding closure member 9 can move to the rear to expose the cut-out portion 3a so that the tape guide system can reach into the cut-out portion 3a to draw some of the magnetic tape out of the cassette casing for loading onto a rotary drum for recording or playback. Thereafter, when the recording or playback is over and the tape cassette is returned to the stand-by state, the pivotal closure lid and the sliding closure member are returned to the aforementioned closed positions. Throughout the rest of this document, the positions of the pivotal closure lid 8 and the sliding closure 9 in which they cover the front opening and the cut-out portion 3a respectively will be referred to as a "stand-by position" and the position of the lid 8 and the closure 9 in which they expose the front opening and the cut-out portion 3a will be referred to as a "use position".

Figure 4:
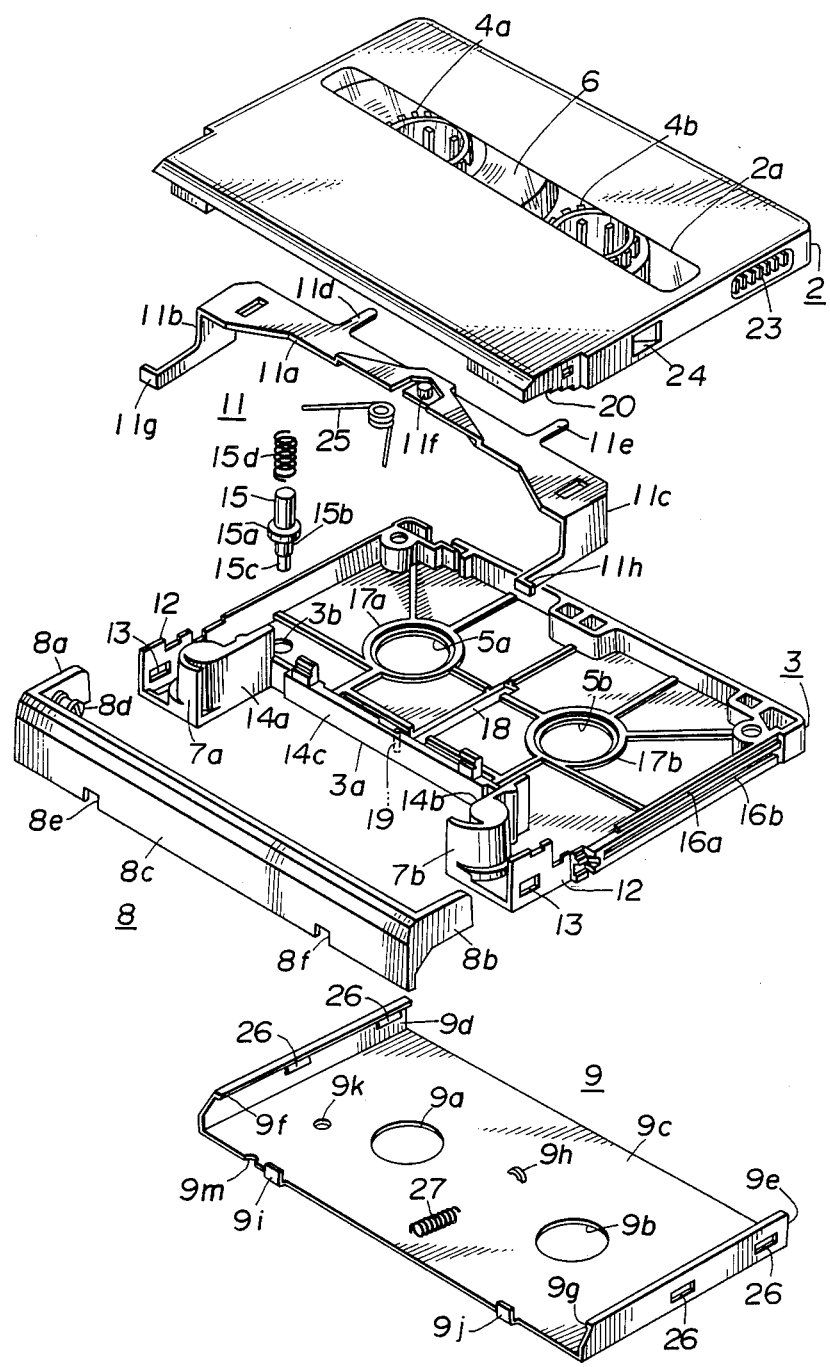
FIG. 4 is an exploded perspective view of the magnetic tape cassette of FIG. 1.

The cassette casing 1 also has a pair of tape guide columns 7a and 7b integrally formed to the left and right sides of the front edge of the lower section 3, as shown in FIG. 4. The magnetic tape 6 is stretched between and around the tape guide columns 7a and 7b so as to follow a predetermined tape run or path along the front edge of the tape cassette and across the front opening over the rotary head.

The essentially rectangular cut-out portion 3a of the lower section 3 extends over a predetermined width so as to expose the rear surface of the magnetic tape 6 stretched between the tape guides 7a and 7b. During recording or reproduction, a device constituting part of the tape handling system or the tape guide system projects into the cut-out portion 3a and draws out a section of the magnetic tape 6. The tape handling system is part of the PCM recorder.

Figure 2:
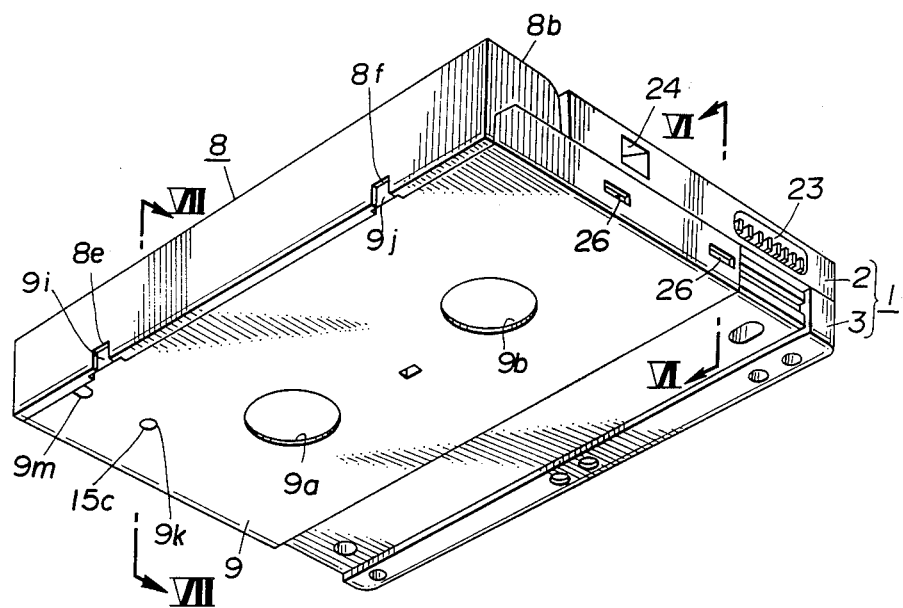
FIG. 2 is a perspective view of the magnetic tape cassette of FIG. 1, viewed from the lower side of the cassette, in which the pivotal closure lid and the sliding closure member are in their respective closed positions for use of the cassette, corresponding to the position illustrated in FIG. 1.
Figure 3:
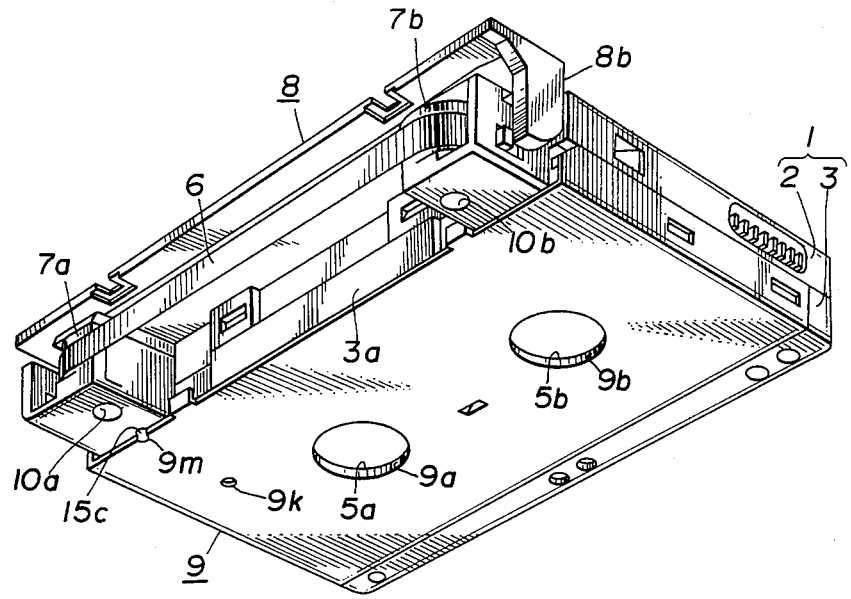
FIG. 3 is a perspective view of the magnetic tape cassette of FIG. 1, viewed from the lower side of the cassette, in which the pivotal closure lid and the sliding closure member are in their respective opens position during use of the cassette.

The pivotal closure lid 8 is elongated along the major dimension of the front opening and has arms 8a, 8b projecting from its opposite ends which pivotably attach lid 8 to the front of the cassette casing 1 by means of pivot shafts 8d. Thus, the pivotal closure lid 8 can be pivoted to selectively cover and expose the front opening of the cassette casing 1. The closure lid 8 also comprises a plate 8c which is elongated in the direction of the opening in the cassette casing 1 and covers the entire length of the front of the cassette casing 1. When the closure lid 8 is rotated to the closed position to cover the front of the cassette casing 1, the arms 8a and 8b lie flush with the contours of the upper section 2 as best shown in FIGS. 1 and 2. When the closure lid 8 is in this position, the closure member 9 is held in its forward position under the arms 8a and 8b as shown in FIGS. 2 and 3 by means described later. The rotary shafts 8d (only one of which is visible in FIG. 4) about which the lid 8 pivots are approximately centered on the inner surfaces of the respective arms 8a, 8b. Cut-away portions 8e, 8f are formed by cutting small grooves into the lower edge of the plate 8c toward the left and right extremes of the cut-out portion 3a of the lower section 3.

The sliding closure member 9 has a flattened U-shaped configuration and is so mounted on the lower section 3 of the cassette casing 1 that it can slide back and forth parallel to the lower surface of the lower cassette section 3. Apertures 9a and 9b respectively corresponding to the reel shaft insertion apertures 5a and 5b are formed in the sliding closure member 9 in such positions that after the sliding closure member 9 slides all the way backwards to expose the cut-out portion 3a, the apertures 9a and 9b are respectively aligned with the reel shaft insertion apertures 5a and 5b.

Positioning holes 10a and 10b are formed through the bottom of the lower section 3 directly under the tape guide columns 7a and 7b respectively.

The sliding closure 9, as shown in FIG. 4 comprises a flat plate 9c which lies parallel to the lower surface of the lower section 3 and side plates 9d, 9e along the left and right sides of the flat plate 9c while which parallel to the outer surfaces of the left and right side walls of the lower section 3. Flanges 9f and 9g are formed by bending the upper ends of the side plates 9d, 9e inwardly. The flanges 9f, 9g are restrained vertically but not horizontally between the side walls of the upper and lower sections 2, 3 after the casing 1 is assembled. After assembly, a spring-engaging anchor 9h formed on the flat plate 9c projects through a spring-accomodating slot 18 in the lower section 3. The spring anchor 9h anchors one end of a tension coil spring 27 designed to bias the closure member 9 in the forward direction. The other end of the tension coil spring 27 engages a spring-engaging column 19 disposed near the cut-out 3a of the lower section 3, with the result that the closure member 9 is biased forward toward a position in which it covers the cut-out portion 3a. This movement of the sliding closure 9 also moves the apertures 9a, 9b out of register with the apertures 5a, 5b so as to completely enclose the tape 6.

Contact pieces 9i and 9j extend upwards perpendicularly from the flat plate 9c at the front of the plate at positions which correspond to the cut-away portions 8e and 8f of the closure lid 8. The contact pieces 9i and 9j enable the recording-reproducing apparatus to slide the closure 9 to the rear in preparation for opening the cassette 1 in a manner described below.

FIG. 4 shows the relative position of the closure lid 8, the sliding closure 9, a reel brake member 11, which is described below, the upper section 2 and the lower section 3. Each of these components may be made of synthetic resin, such as ABS resin. The lower section 3 comprises an essentially rectangular flat plate in which the reel shaft insertion apertures 5a and 5b are formed and a frame including left and right side walls, a front portion in which the tape guide columns 7a, b are formed and a rear wall. Most of the side walls and the outer surface of the flat plate of the lower section 3 are recessed so that the sliding closure 9 lies flush with the outer surface of the remainder of the side walls and floor of the lower section 3.

The front ends of the left and right side walls are stepped laterally inwards by the thickness of the arms 8a, 8b of the closure lid 8 to form support walls 12. The tops of the support walls 12 are formed with indentations. When the upper section 2 and lower section 3 are assembled with the lower section 3, matching support walls 20 in the upper section 2 abut the support walls 12 edge-to-edge. The indentations then form apertures allowing pivotal mounting of the rotary shafts 8d (only one of which is visible in FIG. 4) of the closure lid 8. Rectangular insertion apertures 13 are formed near the front, lower corners of the support walls 12. Shields 14a, 14b and 14c define the three walls of the cut-out portion 3a, whereby the inside of the cassette casing 1 is shielded from the cut-out portion 3a.

Stepped rests 16a (only one of which is visible in FIG. 4) extend along the upper edges of the left and right side walls of the lower section 3 and parallel thereto. The depth of the stepped rests 16a is not as great as the thickness of the arms 8a, 8b of the closure lid 8. Guide grooves 16b extend along each of the side wall of the lower section 3 parallel to each other and to the stepped rests 16b. Similarly to the rests 16a, the guide grooves 16b are not as deep as the arms 8a and 8b of the closure lid 8 are thick.

Figure 6:
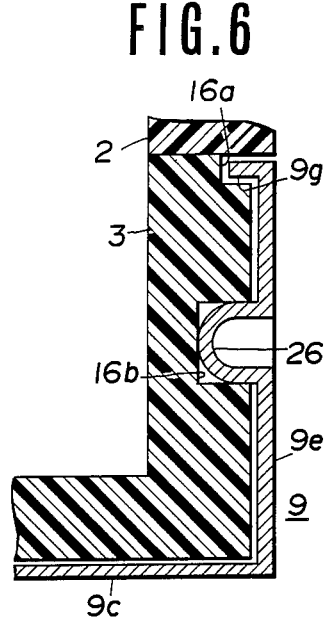
FIG. 6 is an enlarged section taken along line VI—VI of FIG. 2.

As best shown in FIG. 6, the stepped rests 16a receive the upper edges 9g of the sliding closure 9. Also, the guide groove 16b slidably receives inwardly depressed indentations 26 formed in the side plates 9d and 9e of the sliding closure 9. Sliding engagement between the rests 16a and the edges 9g and between the guide grooves 16b and the indentations 26 guides sliding movement of the sliding closure 9 with respect to the cut-out portion 3a along the side walls of the lower section.

Annular collar or flange portions 17a, 17b encircle each of the reel shaft insertion apertures 5a, 5b.

In order to bias the sliding closure 9 toward the forward closed position, the rectangular spring-accommodating slot 18 formed in the bottom plate 3c of the lower section 3 is centered between the reel shaft insertion apertures 5a, 5b and extends with its major dimension parallel to the front-to-rear direction. The spring-engaging column 19 is positioned at the forward end of the spring-accommodating slot 18. The tension spring 27 biasing the closure member 9 forwards is stretched between the column 19 and the anchor projection 9h formed on the closure member 9.

Figure 5:
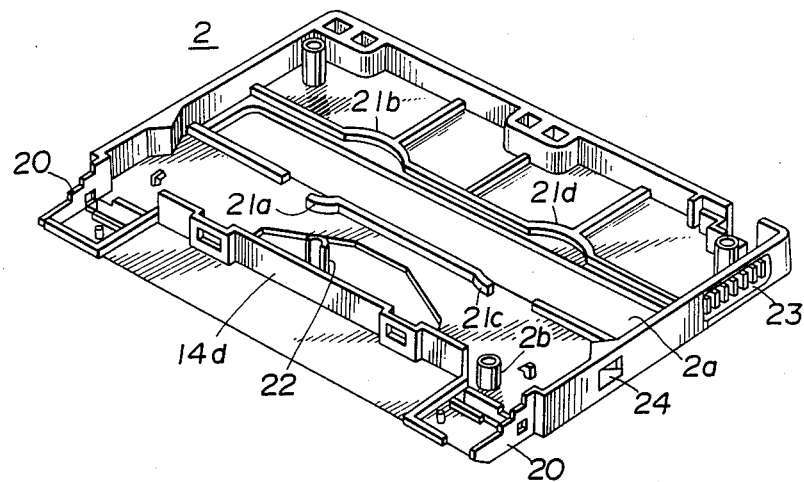
FIG. 5 is an perspective view from the above of the upper section of the tape cassette of FIG. 1, the upper section being shown upside down.

FIGS. 4 and 5 show details of the upper section 2. The upper section 2 comprises an essentially rectangular flat plate in which the transparent window plate 2a is formed and a frame including left and right side walls and a rear wall. The outer contours of the upper section 2 match the outer contours of the lower section 3 and the sliding closure 9.

Support walls 20 are formed so that the forward ends of the left and right side walls are offset inwardly by the thickness of the arms 8a and 8b of the closure lid 8, as are the support walls 12 of the lower section 3. The support walls 20 and 12 define apertures as described above when they are assembled edge-to-edge.

A shielding wall 14d (FIG. 5) is designed to mate with the shielding wall 14c (FIG. 4). When the upper section 2 and lower section 3 are coupled, the shielding walls 14d and 14c abut each other, thereby separating the inside of the cassette casing from the cut-out portion 3a.

Arcuate collars 21a, 21b, 21c and 21d are formed in alignment with the annular collars 17a and 17b of the lower section 3. The reel hubs 4a and 4b are rotatably supported by the collars 21a, 21b and 21c, 21d of the upper section 2 and the annular collars 17a and 17b of the lower section 3. The collars 21a, 21b, 21c and 21d are approximately as thick as the portions of the reel brake member 11 which contact the upper section 2, so that the reel brake member 11 can not protrude beyond the collar portions 21a, 21b, 21c and 21d. This prevents the reel brake member 11 from damaging the magnetic tape 6.

A fixing boss 22 (FIG. 5) of U-shaped configuration in cross-section is formed on the upper section 2 opposite the spring-engaging column 19 of the lower section 3. When the upper section 2 and lower section 3 are connected, the spring-engaging column 19 is received within the opening of the fixing boss 22, and hence the end of the coil spring 26 engaging the spring-engaging column 19 is retained by the end of the fixing boss 22.

A knurled recess 23 is formed near the rearward end of each of the right and left side walls to facilitate a secure grip when the cassette is held in the hand. V-shaped concave supports 24 are formed near the center of the left and right side walls. When the tape cassette is loaded in the recording and reproducing apparatus, the concave supports 24 are engaged by support studs (not shown) from both the right and the left.

Figure 7:
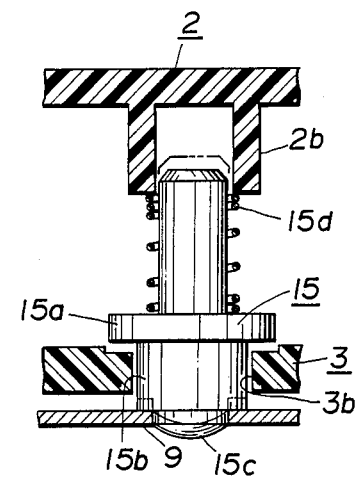
FIG. 7 is an enlarged partial section taken along line VII—VII of FIG. 2.

As shown in FIGS. 5 and 7, a hollow cylindrical boss 2b extends downwards from the upper section 2. A cylindrical locking pin 15 opposing the boss 2b can slide into and out of it vertically. The locking pin 15 has a lower locking head 15c at the end distal from the boss 2b. A flange 15a is formed on the locking pin 15 between the proximal end and the locking head 15c. The locking head 15c is connected integrally to the proximal end and the flange 15a through a section 15b. The section 15b is cylindrical and has a larger diameter than the proximal end. The cylindrical section 15b extends through a circular opening 3b through the lower section. The locking head 15c engages either a circular first locking opening 9k or a semi-circular second locking opening 9m, both formed in the flat plate 9c of the sliding closure 9. When the locking head 15c engages the first locking opening 9k, it locks the sliding closure 9 in its closed position. On the other hand, when the locking head 15c engages the second locking opening 9m, it locks the closure member 9 in its open position.

The locking pin 15 can slide longitudinally into and out of the boss 2b. A bias spring 15d is wound around the proximal end of the locking pin 15. The upper end of the bias spring 15d seats on the lower end of the boss 2b and the lower end of the bias spring 15d seats on the flange 15a. In other words, the flange 15a serves as a spring seat for the spring 15d. At the same time, the flange 15a serves to limit the downward travel of the locking pin in response to the force of the spring 15d. For this reason, the diameter of the flange 15a is larger than the internal diameter of the opening 3b through the lower section.

The spring 15d constantly biases the locking pin 15 downwards so that the locking head 15c protrudes out of the lower surface of the lower section 3 through the opening 3b. The locking pin 15 is normally held in its locking position in which it restricts sliding movement of the sliding closure 9.

Figure 8:
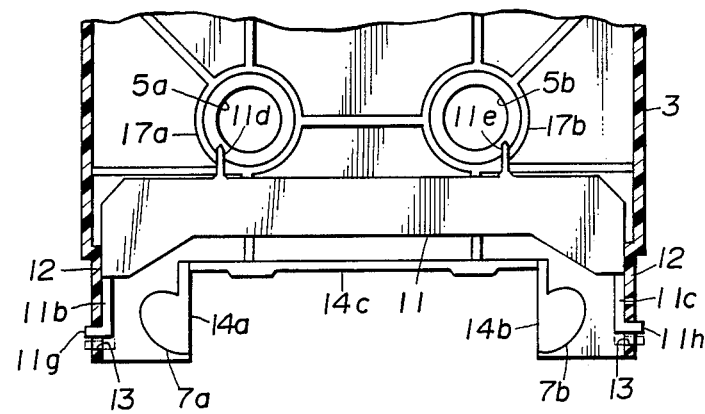
FIG. 8 is a plan view of the lower section of the tape cassette shown in FIG. 4 with the edges of the lower section partially cut away to show the mode of engagement between a brake member and the lower section.

As shown in FIGS. 4 and 8, the reel brake member 11 comprises a slide guide plate 11a which is elongated in a direction parallel to the front opening of the casing and to the lid 8 and lies along the inner surface of the upper section 2. The member 11 also comprises L-shaped arms 11b, 11c which respectively extend perpendicularly downward from either end of the slide guide plate 11a and then forward. Brake pins 11d and 11e corresponding to the reel hubs 4a and 4b respectively extend rearward from the slide guide plate 11a. Brake wheels are formed on the outer peripheral portions of the reel hubs 4a and 4b opposite the brake pins 11d and 11e.

Figure 11:
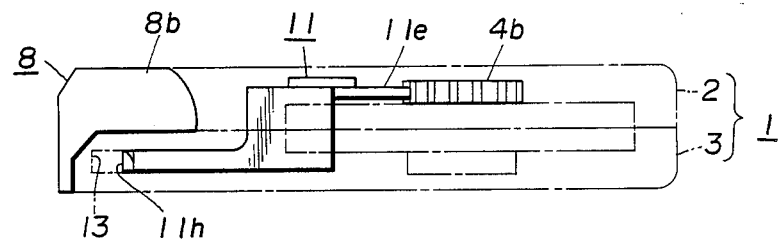
FIG. 11 is a diagrammatic elevation of the magnetic tape cassette of FIG. 1 showing the pivotal closure lid and the sliding closure member in their closed positions while the cassette is not in use.

A spring engaging stud 11f is provided at the center of the slide guide plate 11a, and operating tabs 11g and 11h are formed on the extreme ends of the arms 11b and 11c respectively. The center coil of a torsion spring 25 used to bias the reel brake member 11 towards its braking position is fitted onto the spring-engaging stud 11f. The free ends of the spring 25 press against the rear of the shield wall 14d (FIG. 5) of the upper section 2 so that the brake pins 11d, 11e normally engage the brake wheels of the reel hubs 4a and 4b (see FIG. 11), whereby the reel hubs 4a and 4b are prevented from rotating.

The reel brake member 11 is so disposed within the cassette 1 that the ends of the tabs 11g, 11h protrude through the insertion apertures 13 of the lower section 3 outside of the support walls 12 to a predetermined extent. When the closure lid 8 is pivoted upwards, the protruding tabs 11g, 11h are engaged by the ends of the arms 8a and 8b of the closure lid 8, and the reel brake member 11 is pulled forward against the biasing force of the spring 25. The brake pins 11d, 11e are thus disengaged from the brake wheels of the reel hubs 4a and 4b, allowing the reel hubs 4a and 4b to rotate (see FIG. 15). It should be noted that the closure lid 8 is driven upwards by actuating pins (not shown) of the recording/playback system when the cassette 1 is fully deployed in the operating position. The actuating pins provide the force needed to overcome the force of the torsion spring 25.

Refering to FIGS. 10 and 12 to 14, a pair of locking levers 34 are built into a cassette holder 33 at points opposite each of the cut-outs 8e and 8f in the closure lid 8. Each of the locking levers 34 is pivotably secured to the bottom of the cassette holder 33 for rotation about a pivot. Each of the locking levers has a first arm section 34L with a locking claw section 34N extending upwards from the free end of the first arm section. The locking levers 34 also have a second arm section 34s extending opposite the first arm section 34L with respect to the pivot. The first and second sections 34L and 34s extend oblique to each other in such a manner that, when the first arm section 34L is parallel to the bottom of the cassette holder 33, the second arm section 34s is at an angle of about 45 degrees relative to the bottom of the cassette holder Although it is not clearly shown in the drawings, the locking lever 34 is associated with a biasing means, such as a torsion spring normally biasing the locking lever counterclockwise as viewed in FIG. 10. Therefore, as will be appreciated from FIG. 10, the first arm section 34L is normally biased toward the bottom of the cassette holder 33 and the second arm section 34s is normally held away from the bottom of the casstte holder as in FIGS. 10, 12 and 13.

The locking claw section 34n opposes an opening (not shown) through the bottom of the cassette holder 33. In the position of the cassette holder 33 of FIGS. 10, 12 and 13, the locking claw section 34n extends through the opening into the internal space of the casstte holder. The position of the locking claw when projecting into the internal space 33a of the cassette holder 33 matches the position of the front edge of the sliding closure 9 in its rearwardly shifted or open position. The locking claw section 34n thus restricts forward movement of the sliding closure 9 after the cassette is inserted into the cassette holder as far as the position shown in FIG. 12.

A stopper 35 extends upwards from the floor of the cassette holder 33 near the opening for the locking claw 34n. The stopper 35 is designed to contact the front edge of the sliding closure 9 after the locking engagement between the locking claw 34n and the front edge of the closure member 9 is released to ensure that the closure member 9 will not abrupt shift forward and damage the recording and reproducing mechanism inserted into the cut-out portion 3a of the cassette. This function will be made clearer later.

The cassette holder 33 is also provided with a retainer spring 36 protruding from the ceiling of the cassette holder. The retainer spring 36 engages the upper surface of the tape cassette casing to restrict movement of the latter within the cassette holder.

In addition, a through opening 37 through the floor of the cassette holder 33 allows the head 15c of the locking pin 15 to extend therethrough.

FIGS. 12 to 14 show the operation of the tape cassette 1. When the cassette 1 is not in use (see FIGS. 7 and 8), the front thereof is covered by the closure lid 8 and the sliding closure 9 is biased by the coil spring 27 to its forward position. In that case, the reel brake member 11 is biased rearward by the spring 25 and hence the brake pins 11d, 11e engage the brake wheels of the reel hubs 4a and 4b so that the reel hubs 4a and 4b are locked and cannot rotate. In addition, the reel shaft insertion apertures 5a and 5b of the cassette casing 1 and the corresponding apertures 9a and 9b in the sliding closure member 9 are offset from each other and the cut-out portion 3a is covered by the sliding closure 9. The magnetic tape 6 is thus fully enclosed to prevent dust from entering through the apertures 5a and 5b or the cut-out portion 3a and depositing on the magnetic tape 6, and fingers and the like from touching the magnetic tape 6. Furthermore, the side plates 9d and 9e of the closure member 9 are directly beneath the arms 8a and 8b, whereby the closure lid 8 is prevented from rotating. As a result, when the cassette is not in use, the closure lid 8 is prevented from being opened unintentionally.

In use, the tape cassette is loaded into a recording and reproducing apparatus 28. By inserting the tape cassette into the internal space 33a of the cassette holder 33, the head portion 15c of the locking pin 15 protruding through the hole 3b in the lower section 3 of the cassette casing 1 comes into contact with the floor of the cassette holder. At the same time, the locking claws 34n of the locking levers 34 of the cassette holder 33 of the recording and reproducing apparatus 28 engage the contact member 9i and 9j of the closure member 9 through the cut-away portions 8e and 8f of the closure lid 8. Then, as the tape cassette moves further forward into the recording and reproducing apparatus 28, the sliding closure 9 is held stationary by the locking claws 34n of the locking lever 34, while the cassette casing 1 moves against the biasing force of the coil spring 27.

When the cassette casing 1 is inserted into the cassette holder 33, the locking pin 15 is driven upwards out of the hole 9k to the position shown in phantom lines in FIG. 7 by contact with the floor of the cassette holder 33. From this position, since the end of the head portion 15c is rounded, an upward biasing force is applied to the locking pin by the edge of the opening 9k of the sliding closure 9 as the cassette casing 1 moves relative to the sliding closure member 9. The upward biasing force applied to the locking pin 15 overcomes the downward biasing force applied by the spring 15d and moves the locking pin 15 upwards. Until the sliding closure 9 disengages from the locking pin 15 to allow relative displacement of the cassette casing 1 and the sliding closure 9. A spacer 35 supports the lower section 3 during insertion.

Figure 9:
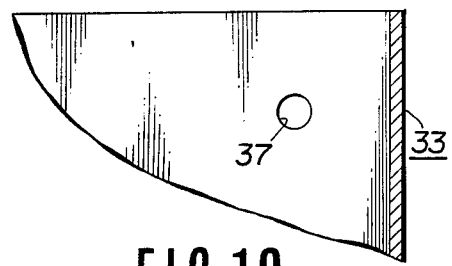
FIG. 9 is a partial plan view of a cassette holder of the recording and reproducing apparatus of FIG. 8, as viewed along arrow IX of FIG. 8.
Figure 10:
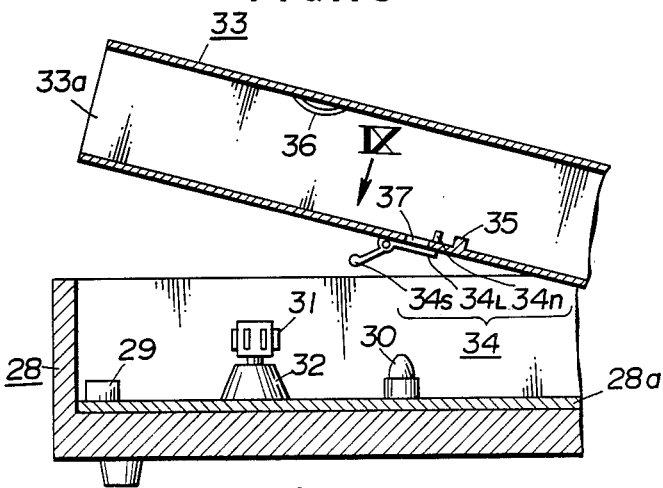
FIG. 10 is a partial section of a recording and reproducing apparatus (PCM recorder) with a rotary head to which the preferred embodiment of the magnetic tape cassette according to the present invention is applied.

Thus the sliding closure 9 slides backwards relative to the cassette casing 1, thus exposing the cut-out 3a and the positioning apertures 10a and 10b (FIG. 9), and aligning the apertures 9a and 9b of the closure member 9 with the reel shaft insertion apertures 5a and 5b so that the reel shaft insertion apertures 5a and 5b are opened.

After the cassette has been fully inserted into the cassette holder 33, the locking pin 15 comes into alignment with a hole 37 through the floor of holder 33 and drops through the holes 9m and 37, thus locking the sliding closure 9 and cassette casing 1 together again, as shown, in FIG. 13. From this position, the cassette holder 33 is ready to be lowered into the recording and reproducing system 28 to the position shown in FIG. 14, which position is specified by a spacer 29.

Figure 15:
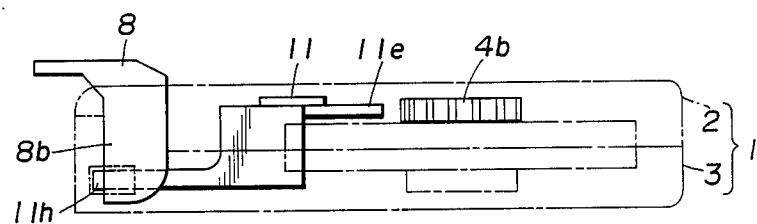
FIG. 15 is a diagrammatic elevation similar to FIG. 10, but showing the pivotal closure lid and the sliding closure member in their open positions while the cassette is in use.

The closure lid 8 is then rotated upwards by the lid actuating pins (not shown) of the recording and reproducing apparatus to the position shown in FIGS. 14 and 15. As the closure lid 8 pivots, the operating tabs 11g, 11h of the reel brake member 11 are pressed forward by the lower ends of the arms 8a, 8b, thus sliding the reel brake member 11 forward against the biasing force of the spring 25. This disengages the brake pins 11d and 11e from the brake wheels of the reel hubs 4a and 4b and releases the reel hubs 4a, 4b so that they can rotate.

Positioning protrusions 30 and reel shafts 31 of the recording and reproducing apparatus 28 are respectively inserted into the positioning apertures 10a and 10b and the reel shaft insertion apertures 5a and 5b, the magnetic tape 6 is exposed at the front of the cassette casing 1, and the tape guide system (not shown) is inserted into the cut-out portion 3a. The guide system draws out some of the magnetic tape and loads it onto the rotary drum of the recording and reproducing apparatus, and then the desired recording or playback can be carried out. Reference numeral 32 designates the base of the reel shaft 31.

When the magnetic tape cassette is taken out of service and returned to a standby condition, a procedure opposite to that described above is carried out.

It will be apparent from the preceding description of the preferred embodiments of the invention that many modifications and variations can be effected by one skilled in the art without departing from the scope of the invention. For example, while in the disclosed embodiments the spring 25 biases the brake member 12 toward the braking position and the lid 8 in moving from the closed position to the open position must overcome the force of the spring 25 in order to release the brake, it is also possible for a spring to bias the brake member 12 toward the released position and for the lid 8 in moving from the open position to the closed position to overcome the force of such a spring in order to apply the brake. Accordingly, the scope of the invention should be determined by the appended claims only.

What is claimed is:

1. A magnetic tape cassette comprising:
   a cassette casing having a mouth through which a magnetic tape is accessible, said mouth including a first opening in a front end face of said casing and a second opening in a lower section of the casing adjacent the front end face;
   a pivotal lid covering and exposing said first opening of said mouth;
   a sliding shutter member slidable with respect to the lower section of said cassette casing and having a planar section covering and exposing said second opening of said mouth, said shutter member being movable between a first position in which it covers second opening and a second position in which it exposes said second opening;
   a movable locking pin formed independently of, but cooperating with, said cassette casing and disposed within said cassette casing to have a motion axis substantially perpendicular to said planar section so as to move along said motion axis, said locking pin normally positioned at a locking position and holding said shutter member in said first position while said cassette is not in use, and movable to a releasing position allowing said shutter member to move to said second position when said cassette is inserted into an associated recording and reproducing apparatus; and
   a coil spring associated with said locking pin to constantly bias said locking pin in order to position said locking pin at said locking position to hold said shutter member in said first position.

2. The magnetic tape cassette as set forth in claim 1, wherein said cassette casing comprises an upper section and a lower section, said upper section including a hollow cylindrical boss normally receiving an upper end of said locking pin and guiding axial movement of the latter.

3. The magnetic tape cassette as set forth in claim 2, wherein said locking pin has an extension extending transversely with respect to said longitudinal axis of said locking pin wherein said coil spring is seated between said extension and the lower end of said boss for normally biasing said locking pin downwardly.

4. The magnetic tape cassette as set forth in claim 1, wherein said locking pin has a locking head engageable with said shutter member when said locking pin is in a first pin position and disengageable from said shutter member upon sliding movement of said shutter member when said locking pin is in a second pin position.

5. The magnetic tape cassette as set forth in claim 4, wherein said shutter member is formed with a though opening through which said locking head protrudes when said locking pin is in said first pin position.

6. The magnetic tape cassette as set forth in claim 5, wherein said locking pin is moved from said first pin position to said second pin position when the cassette is inserted into said recording and reproducing apparatus.

7. The magnetic tape cassette as set forth in claim 6, wherein said recording and reproducing apparatus includes hooking means including a hook releasably engaging said shutter and exerting a sliding force thereupon as said cassette is inserted into said recording and reproducing apparatus.

8. The magnetic tape cassette as set forth in claim 7, wherein said hooking means includes a hook releasing means disengaging said hook from said shutter after said cassette has been inserted into said recording and reproducing apparatus.

9. A magnetic tape cassette comprising:
   a cassette casing having a mouth through which a magnetic tape is accessible, said mouth including a first opening in a front end face of said casing and a second opening in a lower section of the casing adjacent said front end face, and a pair of reel shaft apertures through which driving hubs of tape reels are accessible;

a pivotal lid for covering and exposing said first opening of said mouth;

a sliding shutter member freely slideable in the front-to-rear direction between first and second sliding positions, said reel shaft apertures and said second opening being exposed in said first sliding position and said reel shaft apertures and said second opening being covered by said shutter member in said second sliding position, said sliding shutter member cooperating with said pivotal lid in said second sliding position in such a manner that said shutter member prevents said pivotal lid from exposing said first opening; and a spring-biased locking pin disposed within said cassette casing and movable along its longitudinal axis, said locking pin normally holding said shutter member in said first position while said cassette is not in use, and allowing said shutter member to move to said second position when said cassette is inserted into an associated recording and reproducing apparatus.

10. The magnetic tape cassette as set forth in claim 9, wherein said cassette casing comprises an upper section and a lower section, said upper section including a hollow cylindrical boss normally receiving an upper end of said locking pin and guiding axial movement of the latter.

11. The magnetic tape cassette as set forth in claim 10, wherein said locking pin has an extension extending transversely with respect to said longitudinal axis of said locking pin and further comprising a bias spring seated between said extension and the lower end of said boss for normally biasing said locking pin downwardly.

12. The magnetic tape cassette as set forth in claim 11, wherein said bias spring comprises a compression coil spring.

13. The magnetic tape cassette as set forth in claim 9, wherein said locking pin has a locking head engageable with said shutter member when said locking pin is in a first pin position and disengageable from said shutter member upon sliding movement of said shutter member when said locking pin is in a second pin position.

14. The magnetic tape cassette as set forth in claim 13, wherein said shutter member is formed with a through opening through which said locking head protrudes when said locking pin is in said first pin position.

15. The magnetic tape cassette as set forth in claim 14, wherein said locking pin is moved from said first pin position to said second pin position when the cassette is inserted into said recording and reproducing apparatus.

16. A magnetic tape cassette comprising:

a hollow casing formed with an access opening therein;

a tape transport means including a pair of reel hubs rotatably mounted within said casing in a spaced-apart relationship with each other for supporting a magnetic tape wound thereon, said tape transport means defining a tape run including part of said access opening;

a brake means mounted within said casing and movable between a braking position in which it prevents said hubs from rotating and a releasing position in which it allows said hubs to rotate;

a lid means engageable with said brake means and movable between a closed position in which it covers said opening, thereby partially protecting said tape, and an open position in which it partially uncovers said opening, thereby exposing said tape for cooperation with a recording and reproducing apparatus, said lid means, in moving from said closed position to said open position effecting movement of said brake means from said braking position to said releasing position, and in moving from said open position to said closed position effecting movement of said brake means from said releasing position to said braking position;

mounting means mounting said lid means movably on said casing between said closed position and said open position;

a sliding shutter member slidable with respect to said cassette casing and cooperating with said lid means to fully cover and uncover said access opening, said shutter member being movable between a first position partially covering said access opening and a second position partially uncovering said access opening; and a spring-biased locking pin disposed within said cassette casing and movable along its longitudinal axis, said locking pin normally holding said shutter member in said first position while said cassette is not in use, and allowing said shutter member to move to said second position when said cassette is inserted into an associated recording and reproducing apparatus.

17. The magnetic tape cassette as set forth in claim 16, wherein said mounting means comprises pivot means whereby said lid means pivots between said closed and open positions.

18. The magnetic tape cassette as set forth in claim 16, wherein opposite ends of said lid means form first and second actuating means, and said braking means includes with first and second tab means opposing said first and second actuating means, respectively, and said engagement between said brake means and said lid means is mediated by said first and second tab means and said first and second actuating means.

19. The magnetic tape cassette as set forth in claim 16, wherein said opening is elongated in a given direction, said lid means is elongated in said direction and has first and second arms at its opposite ends, said arms lying in planes perpendicular to said direction, said mounting means comprises first and second pivot means pivotably connected to said casing and respectively rigidly connected to said arms, said brake means includes a portion elongated in said direction and having first and second tabs opposite said first and second arms respectively, and said engagement between said brake means and said lid means is mediated by said first and second tab means and said first and second arms.

20. A magnetic tape cassette comprising:

a cassette casing having a mouth through which a magnetic tape is accessible, said mouth including a first opening in a front end face of said casing and a second opening in a lower section of the casing adjacent the front end face;

a pivotal lid covering and exposing said first opening of said mouth;

a sliding shutter member slidable with respect to the lower section of said cassette casing in a first direction and adapted to cover and expose said second opening of said mouth, said shutter member being movable between a first position in which it covers said second opening and a second position in which it exposes said second opening;

a movable locking pin disposed within said cassette casing and having an axis extending in a second direction oriented substantially perpendicular to said first direction, said locking pin being normally positioned at a locking position and holding said shutter member in said first position while said cassette is not in use, and movable to a release position allowing said shutter member to move to said second position when said cassette is inserted into an associated recording and reproducing apparatus; and a coil spring associated with said locking pin to constantly bias said locking pin in order to position said locking pin at said locking position to hold said shutter member in said first position.

21. A magnetic tape cassette comprising:

a cassette casing having a mouth through which a magnetic tape is accessible, said mouth including a first opening in a front end face of said casing and a second opening in a lower section of the casing adjacent the front end face;

a pivotal lid covering and exposing said first opening of said mouth;

a sliding shutter member slidable with respect to the lower section of said cassette casing in a first direction oriented substantially in parallel to said lower section of said cassette casing and adapted to cover and expose said second opening of said mouth, said shutter member being movable between a first position in which it covers said second opening and a second position in which it exposes said second opening;

a movable locking pin disposed within said cassette casing and having an axis extending in a second direction oriented substantially perpendicular to said first direction, said locking pin being normally positioned at a locking position and holding said shutter member in said first position while said cassette is not in use, and movable along its axis to a release position allowing said shutter member to move to said second position when said cassette is inserted into an associated recording and reproducing apparatus; and a coil spring associated with said locking pin to constantly bias said locking pin in order to position said locking pin at said locking position to hold said shutter member in said first position.

22. A magnetic tape cassette comprising:

a cassette casing having a mouth through which a magnetic tape is accessible, said mouth including a first opening in a front end face of said casing and a second opening in a lower section of the casing adjacent the front end face;

a pivotal lid covering and exposing said first opening of said mouth;

a sliding shutter member slidable with respect to the lower section of said cassette casing in a first direction and adapted to cover and expose said second opening of said mouth, said shutter member being movable between a first position in which it covers said second opening and a second position in which it exposes said second opening;

a movable locking pin disposed within said cassette casing, said locking pin being normally positioned at a first locking position and holding said shutter member in said first position while said cassette is not in use, said locking pin being movable to a release position allowing said shutter member to move to said second position when said cassette is inserted into an associated recording and reproducing apparatus, and movable to a second locking position to hold said shutter in said second position while cassette is in use; and a coil spring associated with said locking pin to constantly bias said locking pin in order to position said locking pin at said locking position to hold said shutter member in said first position.

23. A magnetic tape cassette comprising:

a cassette casing having a mouth through which a magnetic tape is accessible, said mouth including a first opening in a front end face of said casing and a second opening in a lower section of the casing adjacent the front end face;

a pivotal lid covering and exposing said first opening of said mouth;

a sliding shutter member slidable with respect to the lower section of said cassette casing in a first direction and adapted to cover and expose said second opening of said mouth, said shutter member being movable between a first position in which it covers said second opening and a second position in which it exposes said second opening;

a movable locking pin disposed within said cassette casing and having an axis extending in a second direction oriented substantially perpendicular to said first direction, said locking pin being normally positioned at a locking position and holding said shutter member in said first position while said cassette is not in use, said locking pin being movable to a release position allowing said shutter member to move to said second position when said cassette is inserted into an associated recording and reproducing apparatus, and movable to a second locking position to hold said shutter in said second position while cassette is in use; and a coil spring associated with said locking pin to constantly bias said locking pin in order to position said locking pin at said locking position to hold said shutter member in said first position.

24. A shutter locking arrangement for a cassette storing an information recording medium, which comprises a cassette casing having a mouth through which said recording medium is accessible, said mouth including an opening in a lower section of the casing, a sliding shutter member slidable with respect to the loser section of said cassette casing in a first direction oriented substantially in parallel to said lower section of said cassette casing and adapted to cover and expose said opening of said mouth, said shutter member being movable between a first position in which it covers said opening and a second position in which it exposes said opening, a movable locking pin disposed within said cassette casing and having an axis extending in a second direction oriented substantially perpendicular to said first direction said locking pin being normally positioned at a locking position and holding said shutter member in said first position while said cassette is not in use, and being movable to a release position allowing said shutter member to move to said second position when said cassette is inserted into an associated recording and reproducing apparatus, and movable to a second locking position to hold said shutter in said second position while cassette is in use; and a coil spring associated with said locking pin to constantly bias said locking pin in order to position said locking pin at said locking position to hold said shutter member in said first position.

* * * * *